(12) United States Patent
Bennett

(10) Patent No.: US 8,844,864 B2
(45) Date of Patent: Sep. 30, 2014

(54) MAIN LANDING GEAR WITH RIGID REAR STAY

(75) Inventor: Ian Robert Bennett, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 305 days.

(21) Appl. No.: 13/392,354

(22) PCT Filed: Aug. 16, 2010

(86) PCT No.: PCT/GB2010/051351
§ 371 (c)(1), (2), (4) Date: May 14, 2012

(87) PCT Pub. No.: WO2011/023980
PCT Pub. Date: Mar. 3, 2011

(65) Prior Publication Data
US 2012/0217341 A1  Aug. 30, 2012

(30) Foreign Application Priority Data
Aug. 25, 2009  (GB) .................................. 0914764.6

(51) Int. Cl.
*B64C 25/12* (2006.01)
*B64C 25/20* (2006.01)
*B64C 25/34* (2006.01)
*B64C 25/14* (2006.01)

(52) U.S. Cl.
CPC ........... *B64C 25/14* (2013.01); *B64C 2025/125* (2013.01); *B64C 25/20* (2013.01); *B64C 25/34* (2013.01)
USPC .................................. 244/102 A; 244/102 R

(58) Field of Classification Search
USPC .... 244/100 R, 102 R, 102 A, 102 SL, 102 SS
See application file for complete search history.

(56) References Cited

U.S. PATENT DOCUMENTS 4,345,727 A * 8/1982 Brown et al. .............. 244/102 R
5,086,995 A * 2/1992 Large ........................ 244/102 R
(Continued)

FOREIGN PATENT DOCUMENTS

CN  101065292  10/2007
CN  101312877  11/2008
(Continued)

OTHER PUBLICATIONS

U.K. Intellectual Property Office, Application No. GB 0914764.6, Search Report Under Section 17(5), Dec. 23, 2009, p. 1-3.
(Continued)

*Primary Examiner* — Tien Dinh
*Assistant Examiner* — Nicholas McFall
(74) *Attorney, Agent, or Firm* — Hunton & Williams LLP

(57) ABSTRACT

A main landing gear assembly for an aircraft comprising: an elongate beam pivotally coupled about its longitudinal axis to the aircraft such that the axis of rotation of the elongate beam is generally parallel to the longitudinal axis of the aircraft fuselage; a shock strut pivotally coupled at a first end to the elongate beam and coupled at a second end to a wheel assembly; a folding forward stay pivotally coupled at a first end to the elongate beam and pivotally coupled at a second end to the shock strut; and a rigid rear stay pivotally coupled at a first end to the aircraft and pivotally coupled at a second end to the shock strut, the rigid rear stay being arranged to restrain the path of the shock strut when moving between a deployed and a retracted position such that the wheel assembly is located forward and inboard in the retracted position in comparison with its location in the deployed position.

18 Claims, 3 Drawing Sheets

(56) References Cited

U.S. PATENT DOCUMENTS

Figure 1A:
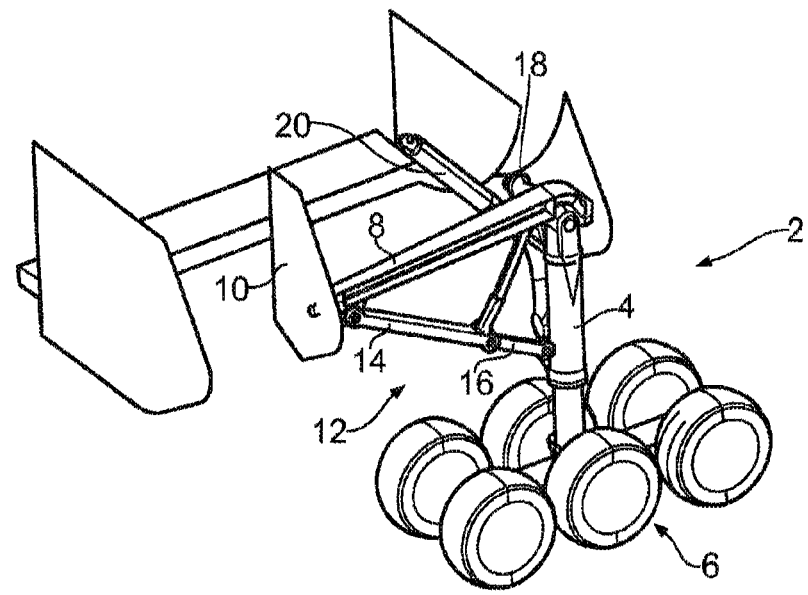

| | | |
|---|---|---|
| 6,409,121 B1 | 6/2002 | Lindahl |
| 2007/0158496 A1 | 7/2007 | Yourkowski et al. |

FOREIGN PATENT DOCUMENTS

| | | |
|---|---|---|
| CN | 101481015 | 7/2009 |
| EP | 0 451 910 | 10/1991 |
| EP | 0 564 772 | 10/1993 |
| EP | 0615901 | 9/1994 |
| EP | 0634320 | 1/1995 |
| FR | 2 800 705 | 5/2001 |
| FR | 2885596 | 11/2006 |
| JP | 2001347997 | 12/2001 |
| JP | 2005240823 | 9/2005 |

OTHER PUBLICATIONS

International Searching Authority (European Patent Office), International Application No. PCT/GB2010/051351, PCT Transmittal of the International Search Report and the Written Opinion of the International Searching Authority, May 6, 2011, p. 1-12.

The State Intellectual Property Office of the People's Republic of China, Application No. 201080038359.8, Notice on the First Office Action, Dec. 31, 2013, p. 1-16 (includes original document and translation).

Japanese Intellectual Property Office, Notice of Reasons for Rejection, Application No. P2012-526122, Apr. 8, 2014, p. 1-6 (includes translation).

\* cited by examiner

MAIN LANDING GEAR WITH RIGID REAR STAY

It is well known for commercial and military aircraft, and in particular the larger, wide bodied aircraft, to have at least one pair of main landing gear assemblies that are arranged to be moveable between a deployed position in which the main landing gear assemblies extend for use and a retracted position in which the landing gear is stowed within specific compartments located either within the underside of the wings or within the fuselage of the aircraft, or sometimes a combination of both. The landing gear assemblies are typically either mounted to the underside of a wing or directly to the aircraft fuselage.

It is known for wing mounted landing gears to be supported by a pair of folding stays, a forward stay and an aft stay, with a significant angle between the two stays, i.e. each stay extends substantially forward or aft of the main telescopic shock strut of the landing gear. The function of the two stays is to transfer the forward, aft and side loads applied to the shock strut during take-off and landing to the fuselage. This enables the mounting of the landing gear assembly to the wing to be reduced in strength and therefore weight. A similar configuration is also known for fuselage mounted landing gear assemblies, with the folding stays provided for the same reason of redistributing the loadings applied to the main shock strut to other mounting points on the fuselage. However, this arrangement using two folding stays mounted to the fuselage poses a potential problem with regards to moving the landing gear assembly between its extended and stowed positions. For example, the landing gear cannot be fully retracted inboard if its length is such that it would strike a central section of the aircraft (such as the keel beam) or its partner landing gear from the opposite side. The gear must therefore move the wheel or wheels forward (or aft) as well as inboard then retracting, which requires an extra degree of freedom to do this. With two folding stays careful care and attention must be paid to ensure that the sequence of operation in which the individual stays are folded whilst the landing gear is moved between its two positions is properly controlled and timed to avoid undesired jamming of the landing gear during deployment or retraction. This typically requires at a minimum at least two separate retraction actuators to separately control the movement of the landing gear relative to each of the stays. It would therefore be beneficial to provide an aircraft main landing gear that at least reduced one or more of these disadvantages.

According to a first aspect of the present invention there is provided a main landing gear assembly for an aircraft comprising an elongate beam pivotally coupled about its longitudinal axis to the aircraft such that the axis of rotation of the elongate beam is generally parallel to the longitudinal axis of the aircraft fuselage, a shock strut pivotally coupled at a first end to the elongate beam and coupled at a second end to a wheel assembly, a folding forward stay pivotally coupled at a first end to the elongate beam and pivotally coupled at a second end to the shock strut, and a rigid rear stay pivotally coupled at a first end to the aircraft and pivotally coupled at a second end to the shock strut, the rigid rear stay being arranged to restrain the path of the shock strut when moving between a deployed and a retracted position such that the wheel assembly is located forward and inboard in the retracted position in comparison with its location in the deployed position.

In addition, the path of the shock strut may move further forward than inboard.

Additionally or alternatively, the longitudinal separation of the first end of the rigid rear stay and the first end of the shock strut may be no greater than the length of the shock strut. Alternatively, the longitudinal separation of the first end of the rear stay and the first end of the shock strut may be no greater than half the length of the rear stay.

Additionally or alternatively, the axis of the pivot coupling between the rear stay and the aircraft may intersect the pivotal coupling between the shock strut and elongate beam. Additionally, wherein the pivotal coupling between the rear stay and aircraft comprises a single axis pivot.

The main landing gear assembly may further include a telescopic actuator pivotally coupled at a first end to the shock strut and at a second end the aircraft fuselage, such that movement of the actuator between an extended and a retracted condition causes movement of the landing gear assembly between the deployed and retracted positions.

Additionally or alternatively, the folding forward stay may be pivotally coupled to the first end of the elongate beam about a single pivot axis substantially orthogonal to the elongate beam.

Additionally or alternatively, the rigid rear stay may be no greater in length than the shock strut. This contributes to the landing gear assembly being particularly compactly packaged on the aircraft fuselage, particularly avoids the rear stay extending a substantial distance aft of the remainder of the landing gear assembly, thus minimising the space requirements for the assembly.

Figure 1B:
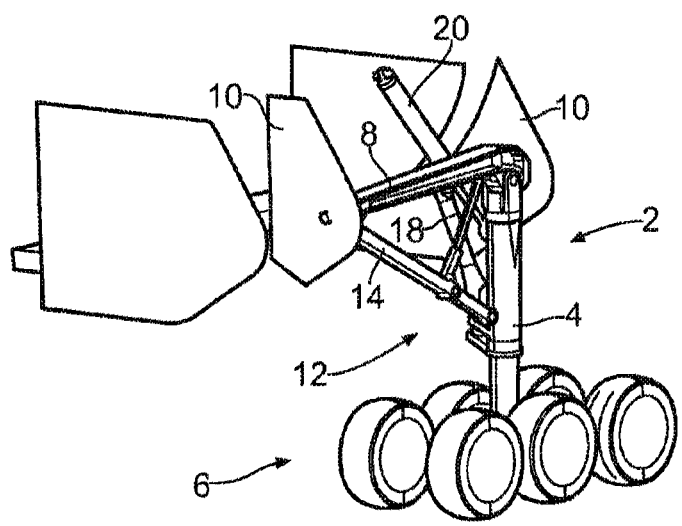
Figure 2A:
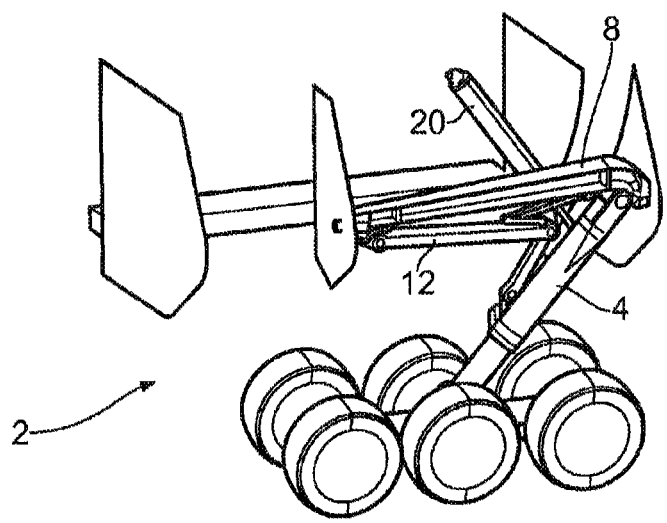
Figure 2B:
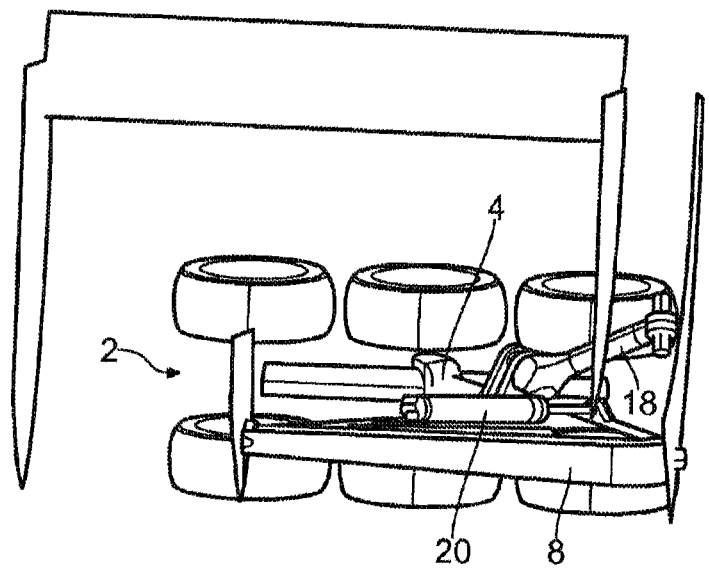
Figure 3:
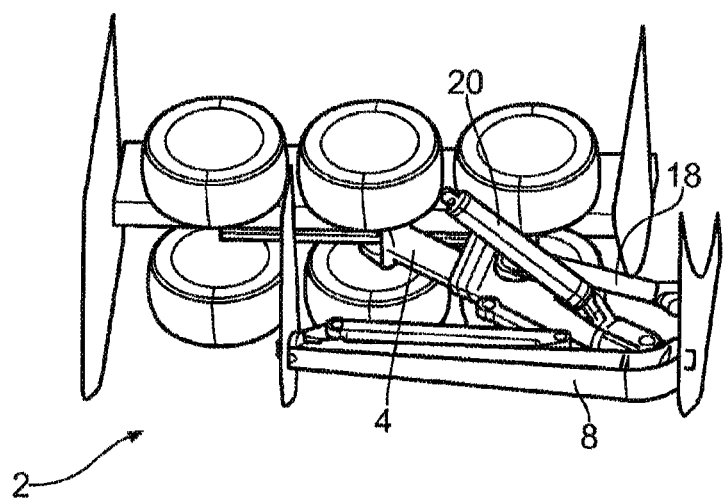

Embodiments of the present invention are described below, by way of illustrative example only, with reference to the accompanying figures, of which:

FIGS. 1A and 1B schematically illustrate a main landing gear assembly according to an embodiment of the present invention in the fully deployed position;

FIGS. 2A and 2B schematically illustrate the same main landing gear assembly in a partially retracted position; and FIG. 3 schematically illustrates the main landing gear assembly in the fully retracted position.

FIGS. 1A and 1B figuratively illustrate a main landing gear assembly according to an embodiment of the present invention. The main landing gear assembly 2 includes a telescopic shock strut 4 of a conventional kind well known to the skilled person. Connected to the lower end of the shock strut is a conventionally arranged wheel assembly 6 that may include, for example, a bogie beam and a number of pairs of wheel and tires, together with conventionally associated items such as torque links and brake rod assemblies. The upper end of the shock strut is pivotally connected to one end of an elongate pintle beam 8. The elongate beam 8 extends forwardly from the top of the shock strut 4 (i.e., in a direction towards the nose of the aircraft). The elongate pintle beam 8 is itself pivotally connected to appropriate elements 10 of the aircraft fuselage. The fuselage elements 10 may, for example, be respective fuselage ribs. The pivots by which the elongate beam 8 is pivotally connected to the fuselage elements 10 have a single pivot axis that is arranged to coincide with the longitudinal axis of the elongate beam 8 itself. This constrains the elongate beam 8 to being able to only rotate about the common pivot axis. Although as mentioned the embodiment illustrated shows the elongate pintle beam 8 being connected to the fuselage elements 10 by pivots at either end of the beam, it will be appreciated that other arrangements of pivots may be utilised provided that the elongate beam remains constrained to a single axis of rotation, preferably substantially coincident with the longitudinal axis of the elongate beam. For example, one or more pivots may be provided along the length of the elongate beam, although this would require the use of alternative fuselage mounting points which may or may not be readily available or appropriate.

Connected between an intermediate position of the shock strut 4 and the forward end of the elongate beam 8 is a folding forward stay 12, that when the main landing gear is in the deployed position as illustrated in FIGS. 1A and 1B, forms a diagonal brace between the shock strut 4 and the elongate pintle beam 8 in a conventional manner. The forward stay 12 has a first, upper, member 14 and a second, lower, member 16. The upper member 14 is pivotally connected at one end to the forward end of the pintle beam 8 by means of a single axis pivot, while the lower member 16 is similarly connected to the shock strut via a further single axis and pivot. The upper and lower stay members are pivotally coupled to one another by means of a further single axis pivot. A folding, over-centre, lock stay is arranged in a conventional manner between the common hinge point of the upper and lower forward stay members and the elongate pintle beam 8. The shock strut 4, elongate beam 8 and folding forward stay 12 are all arranged to lie substantially within the same plane.

A rigid rear stay 18 is further provided pivotally connected at the one end to the shock strut 4 and also pivotally connected at its opposite end to the aircraft fuselage. The rigid rear stay is preferably coupled to a side of the shock strut 4 at a mid point on the shock strut, which may, for example, be coincident with the coupling point of the shock strut to the lower member 16 of the folding forward stay 12. The upper end of the rigid rear stay 18 is coupled to the aircraft fuselage inboard of the upper end of the shock strut In geometric terms the pivot point of the rear stay to the aircraft structure 18 defines the centre of a sphere and the lower end of the rear stay where it attaches to the shock strut is compelled to follow the surface of the sphere as the gear is retracted or deployed. When the axis of the pivot point of the rear stay to the aircraft structure intersects the pivot point of the shock strut to the elongate member a special case occurs in which the rear stay to shock strut joint follows a line of constant latitude on the sphere. This is equivalent to the rear stay to shock strut joint following the surface of a cylinder and hence in this particular arrangement a single axis pivot may be used between the shock strut and the aircraft structure. However, it will be appreciated that multi-axis pivots, such as spherical bearings or cardan joints for example, may equally be used in this particular arrangement if so desired. In other arrangements where the bottom end of the shock strut follows a non-cylindrical path multi-axis pivots must be used.

The bottom end of the shock strut (coupled to the wheel assembly) will be compelled to follow a path dictated by its attachment point to the elongate (pintle) beam 8, and the motion of the rear stay to shock strut joint.

A single telescopic retraction actuator is provided coupled at one end to the shock strut 4 and at its opposite end to a suitable mounting point on the aircraft fuselage. The upper mounting point of the retraction actuator 20 is forward of the shock strut.

To retract the main landing gear starting from the fully deployed (down) position, an unlock actuator (not shown) pulls the forward stay lock links "under centre" to release the lock on the forward stay 14. The retraction actuator 20 is activated and begins to retract from its fully extended state. As the retraction actuator 20 reduces in overall length it pulls forward on the shock strut 4. As previously noted, the bottom end of the shock strut is constrained to move in a path defined by the rigid rear stay 18. In the illustrated embodiment initially the majority of the motion of the lower end of the shock strut is forward. FIGS. 2A and 2B show different views of the main landing gear assembly in a partially retracted position corresponding to a point in the path of the shock strut at which the majority of the motion has been forward. Referring to FIG. 2B, which is a view of the main landing gear from above the elongate pintle beam 8, it can be seen that in the illustrated embodiment the pivot point of the upper end of the rigid rear stay 18 is set a small distance aft of the pivot point of the shock strut 4 to the elongate beam 8. Moving the upper pivot point of the rear stay forward or aft relative to the upper pivot point of the shock strut varies the proportion of forward movement of the bottom end of the shock strut (and hence wheel assembly) relative to the inboard movement. In some embodiments the longitudinal separation of the above mentioned pivot points is such that the bottom end of the shock strut is arranged to move forward a greater distance than it moves inboard. By limiting the amount of inboard movement the space within the aircraft structure may be minimised. In some embodiments the longitudinal separation of the pivot points is no greater than half the length of the rear stay, thus achieving the desired ratio of inboard to forward movement. Moving the upper pivot point of the rear stay further forward than the upper pivot point of the shock strut causes the bottom of the shock strut to first move forwards and outboard before moving forwards and inboard. In some circumstances this may be preferable, for example to avoid ordnance on military aircraft.

As the retraction actuator 20 continues to retract the motion of the lower end of the shock strut 4 moves from being mostly forward to being mostly inboard, i.e. swinging inwardly and upwardly to a final fully retracted position, shown in FIG. 3, in which the wheel assembly is fully retracted within the aircraft fuselage.

The relatively small longitudinal separation between the upper pivot points of the shock strut and rigid rear stay ensures that the main landing gear 2 can travel sufficiently forward such that, for example, at least the rear most wheels of the wheel assembly 6 are at least level with the upper pivot of the shock strut so that the landing gear bay into which the main landing gear is retracted can be most advantageously located and packaged with the aircraft fuselage. Additionally, the relatively short length of the rigid rear stay 18 enhances the packaging of the landing gear assembly, since it is not required to make provision for separately housing the rigid rear stay 18 as is required where the rigid rear stay is significantly longer than the shock strut and mounted to the aircraft fuselage at a distance significantly aft of the pivot point of the shock strut. In preferred embodiments the longitudinal separation of the pivot point of the shock strut and upper end of the rigid rear stay is less than the length of the shock strut, and more preferably is less than half the length of the shock strut.

The arrangement of the main landing gear according to embodiments of the present invention exhibits various advantages over conventional alternative arrangements known in the art. These advantages include mounting the forward folding stay 12 between the shock strut 4 and the elongate pintle beam 8 such that only relatively simple, and therefore low cost and low weight, pivot mechanisms are required between the folding stay and the elongate beam and shock strut. Additionally, it is advantageous for the elongate beam 8 to be mounted directly to the aircraft fuselage, since it is generally true that the existing structures of the fuselage are stronger and therefore more suitable to carry the loads transferred from the landing gear assembly when in use. The wing mounted landing gear assemblies generally require additional strengthening structures to be added to the wing, thus increasing the cost and weight of the aircraft. Furthermore, by using a rigid rear stay 18 the motion of the shock strut under the influence of the retraction actuator is constrained to follow a predefined path, thereby removing the need for any sequencing actuators and control mechanism that would otherwise be the case if a folding rear stay was used. The length and placement of the upper pivot point of the rigid rear stay also provides benefits in the overall packaging of the main landing gear assembly within the aircraft fuselage.

The invention claimed is:

1. A main landing gear assembly for an aircraft comprising:
an elongate beam pivotally coupled about its longitudinal axis to the aircraft such that the axis of rotation of the elongate beam is generally parallel to the longitudinal axis of the aircraft fuselage;
a shock strut pivotally coupled at a first end to the elongate beam and coupled at a second end to a wheel assembly;
a folding forward stay pivotally coupled at a first end to the elongate beam such that rotation of the elongate beam causes the folding forward stay to pivot about the longitudinal axis of the elongate beam and pivotally coupled at a second end to the shock strut; and
a rigid rear stay pivotally coupled at a first end to the aircraft and pivotally coupled at a second end to the shock strut so as to move therewith, the rigid rear stay being arranged to restrain the path of the shock strut when moving between a deployed and a retracted position such that the wheel assembly is located forward and inboard in the retracted position in comparison with its location in the deployed position.

2. A main landing gear assembly according to claim 1, wherein the path of the shock strut moves further forward than inboard.

3. A main landing gear according to claim 1, wherein the longitudinal separation of the first end of the rigid rear stay and the first end of the shock strut is no greater than the length of the shock strut.

4. A main landing gear assembly according to claim 1, wherein the longitudinal separation of the first end of the rear stay and the first end of the shock strut is no greater than half the length of the rear stay.

5. A main landing gear assembly according to claim 1, wherein the axis of the pivot coupling between the rear stay and the aircraft intersects the pivotal coupling between the shock strut and elongate beam.

6. A main landing gear assembly according to claim 5, wherein the pivotal coupling between the rear stay and aircraft comprises a single axis pivot.

7. A main landing gear assembly according to claim 1 further comprising a telescopic actuator pivotally coupled at a first end to the shock strut and at a second end to the aircraft fuselage such that movement of the actuator between an extended and a retracted condition causes movement of the landing gear assembly between the deployed and retracted positions.

8. A main landing gear assembly according to claim 1, wherein the folding forward stay is pivotally coupled to the first end of the elongate beam about a single pivot axis substantially orthogonal to the elongate beam.

9. A main landing gear assembly according to claim 1, wherein the rigid rear stay is no greater in length than the shock strut.

10. A main landing gear assembly for an aircraft comprising:
an elongate beam pivotally coupled about its longitudinal axis to the aircraft such that the axis of rotation of the elongate beam is generally parallel to the longitudinal axis of the aircraft fuselage;
a shock strut pivotally attached at a first end to the elongate beam and coupled at a second end to a wheel assembly;
a folding forward stay directly pivotally attached at a first end to the elongate beam and pivotally coupled at a second end to the shock strut; and
a rigid rear stay directly pivotally coupled at a first end to the aircraft and pivotally attached at a second end to the shock strut, the rigid rear stay being arranged to restrain the path of the shock strut when moving between a deployed and a retracted position such that the wheel assembly is located forward and inboard in the retracted position in comparison with its location in the deployed position.

11. A main landing gear assembly according to claim 10, wherein the path of the shock strut moves further forward than inboard.

12. A main landing gear according to claim 10, wherein the longitudinal separation of the first end of the rigid rear stay and the first end of the shock strut is no greater than the length of the shock strut.

13. A main landing gear assembly according to claim 10, wherein the longitudinal separation of the first end of the rear stay and the first end of the shock strut is no greater than half the length of the rear stay.

14. A main landing gear assembly according to claim 10, wherein the axis of the pivot coupling between the rear stay and the aircraft intersects the pivotal coupling between the shock strut and elongate beam.

15. A main landing gear assembly according to claim 14, wherein the pivotal coupling between the rear stay and aircraft comprises a single axis pivot.

16. A main landing gear assembly according to claim 10 further comprising a telescopic actuator pivotally coupled at a first end to the shock strut and at a second end to the aircraft fuselage such that movement of the actuator between an extended and a retracted condition causes movement of the landing gear assembly between the deployed and retracted positions.

17. A main landing gear assembly according to claim 10, wherein the folding forward stay is pivotally coupled to the first end of the elongate beam about a single pivot axis substantially orthogonal to the elongate beam.

18. A main landing gear assembly according to claim 10, wherein the rigid rear stay is no greater in length than the shock strut.

* * * * *